United States Patent [19]

Melzer et al.

[11] 4,430,362
[45] Feb. 7, 1984

[54] PRODUCTION OF MAGNETIC RECORDING MEDIA

[75] Inventors: Milena Melzer, Ludwigshafen; Norbert Schneider, Altrip; Helmut Kopke, Weisenheim; Klaus Schoettle, Heidelberg; Eberhard Koester, Frankenthal; Werner Balz, Limburgerhof; Werner Grau, Bobenheim-Roxheim, all of Fed. Rep. of Germany

[73] Assignee: BASF Aktiengesellschaft, Fed. Rep. of Germany

[21] Appl. No.: 450,490

[22] Filed: Dec. 16, 1982

[30] Foreign Application Priority Data

Dec. 28, 1981 [DE] Fed. Rep. of Germany ....... 3151590

[51] Int. Cl.$^3$ ............................................. H01F 10/02
[52] U.S. Cl. ...................................... 427/48; 427/128; 427/130
[58] Field of Search .......................... 427/48, 128, 130

[56] References Cited

U.S. PATENT DOCUMENTS

| | | | |
|---|---|---|---|
| 2,871,218 | 1/1959 | Schollenberger | 260/45.4 |
| 2,899,411 | 8/1959 | Schollenberger | 260/77.5 |
| 3,144,352 | 8/1964 | Talley | 117/138.8 |
| 3,149,995 | 9/1964 | Bauer | 117/66 |
| 3,247,017 | 4/1966 | Eichler et al. | 117/138.8 |
| 3,320,090 | 5/1967 | Graubart | 117/161 |
| 3,437,510 | 4/1969 | Diaz | 252/62.54 |
| 3,650,828 | 3/1972 | Higashi | 117/235 |

FOREIGN PATENT DOCUMENTS 1132956 11/1968 United Kingdom.
1375295 11/1974 United Kingdom.

*Primary Examiner*—Bernard D. Pianalto
*Attorney, Agent, or Firm*—Keil & Witherspoon

[57] ABSTRACT

Magnetic recording media are produced by a method wherein a fluid dispersion of finely divided magnetically anisotropic material in a film-forming binder mixture containing a polyurethane (obtained from a polyester which possesses free hydroxyl groups, and a di- or polyisocyanate) is applied to a non-magnetic base and the magnetic layer is then hardened.

3 Claims, No Drawings

PRODUCTION OF MAGNETIC RECORDING MEDIA

The present invention relates to a process for the production of magnetic recording media by applying a fluid dispersion of finely divided magnetically anisotropic material in a film-forming binder mixture which contains a polyester possessing free hydroxyl groups, a phenoxy resin and a di- or polyisocyanate to a non-magnetic base and then hardening the magnetic layer.

Compared with magnetic recording media having magnetic layers based on conventional magnetic iron oxides, those with magnetic layers based on ferromagnetic chromium dioxide, cobalt-containing iron oxides of ferromagnetic metal particles consisting essentially of iron are being used to an increasing extent, especially in the audio and video fields, because of their very considerably improved recording characteristics. However, regarding the quality of the recording media, the choice of the film-forming polymeric binder is just as important as the magnetic and processing properties of the magnetic material.

It has been disclosed that magnetic recording media which must withstand high mechanical stresses may be produced using, as the magnetic layer, a dispersion of magnetic material in a binder based on a polyurethane elastomer or on a mixture of a polyurethane elastomer with another polymeric binder. However, polyester-urethane elastomers, as described in, for example, German Published Application DAS 1,106,959, and polyether-urethane elastomers, as described in U.S. Pat. No. 2,899,411, do not give suficiently high surface hardness when used alone as the binder. In addition, polyurethane elastomers of the stated types, when used as the sole binder, have the disadvantage that magnetic particles dispersed in their solutions are not satisfactorily oriented when the recording medium is passed through a magnetic field after the coating procedure. Furthermore, products of this type, which are produced by the melt condensation method, in many cases are not completely free of high molecular weight, poorly soluble constituents which may cause inhomogeneities in the magnetic coating and surface flows.

The patent literature contains a number of proposals for overcoming the disadvantages of insufficient coating hardness, which results from using polyurethanes as the sole binder, by admixing a further binder. The improvement in coating hardness achieved by admixing a polyester, as described in German Published Application DAS 1,269,661, is however attended by the risk of adjacent layers in the pack sticking together at relatively high temperatures and/or when tightly wound. Admixing polyurethane elastomers with relatively high molecular weight phenoxy resins, as described in German Published Application DAS 1,295,011, gives a product which exhibits satisfactory mechanical properties up to about 65° C., but the presence of a phenoxy resin has a detrimental effect on the orientability of the magnetic particles in a preferential direction in a magnetic field. It has also been disclosed that mixtures of vinyl chloride copolymers with polyurethane elastomers may be used as binders for magnetic layers. Thus, U.S. Pat. No. 3,144,352 discloses that vinyl chloride/acrylonitrile copolymers may be added to polyurethane elastomers, but the relatively low thermal stability of the resulting products is disadvantageous (cf. German Laid-Open Application DOS 2,037,605 in this connection). German Published Application DAS 1,282,700 recommends the use of a combination of a polyurethane elastomer with a vinyl chloride/vinyl acetate copolymer as a binder for magnetic layers, but this combination does not impart to the magnetic layer the properties it is required to exhibit in practice at elevated temperatures. When polyester-urethanes are mixed with polycarbonates, as proposed in German Laid-Open Application DOS 2,114,611, the binder mixture obtained gives a solution which is not completely satisfactory in respect of its viscosity.

It has also been proposed (U.S. Pat. No. 3,149,995) that the polyurethane binder be produced directly in the coating mix containing the magnetic pigment, the prepolymer and the solvent, by adding a hardener, the binder being formed by the reaction of the isocyanate groups of the prepolymer with the active hydrogen atoms of the hardener. The disadvantage of this procedure is that, as a result of the reaction proceeding rapidly at the outset, fluctuations in the viscosity of the magnetic dispersion may occur which may result in inhomogeneities in the magnetic layer.

German Published Application DAS 1,130,612 describes a similar procedure, in which the magnetic iron oxide is dispersed in a mixture of a hydroxyl-containing polyester and a physically drying binder, eg. a polyvinyl derivative or nitrocellulose, and a polyisocyanate, for forming a polyurethane binder, is added shortly before the dispersion is applied to the base. This procedure, however, does not result in magnetic recording media having the properties required nowadays.

It is an object of the present invention to provide a binder mixture for a process for the preparation of magnetic recording media using finely divided magnetically anisotropic material, with which mixture magnetic recording media can be obtained which have improved magnetic as well as mechanical properties. In particular, it is an object of the present invention to so improve the process for the production of magnetic recording media that the magnetic properties of the magnetic material employed, for example a high coercive force, high remanence and good orientability of particles in the magnetic layer, come out fully in the resulting recording media in the form of improved recording characteristics, and at the same time the mechanical resistance of the magnetic layer meets the higher demands now made on audio tapes and in particular on video tapes.

We have found that this object is achieved, and that magnetic recording media having the above desired properties are obtained, by dispersing a finely divided magnetically anisotropic material in a solution of a film-forming binder mixture and, if desired, a further polymeric binder, in an organic solvent, with the addition of conventional assistants, applying a layer of the fluid dispersion to a non-magnetic base, orienting the magnetic particles by means of a magnetic field, crosslinking the binder components and drying the resulting layer, if the film-forming binder mixture comprises (A) from 60 to 90 percent by weight of a polyurethane binder, obtained from a straight-chain or branched polyester containing 0.5–8% of hydroxyl groups and a di- or polyisocyanate, and (B) from 10 to 40 percent by weight of a thermoplastic hydroxyl-containing phenoxy resin having a molecular weight of from 10,000 to 50,000, with the proviso that the di- or polyisocyanate is added, in an amount of from 0.6 to 1.3 equivalents, based on one equivalent of hydroxyl groups of the polyester, only after the magnetically anisotropic material has been dispersed in components (A) and/or (B). Furthermore, we have found that very advantageous products are also obtained if the binder mixture additionally contains from 0.5 to 10, in particular from 2 to 5, percent by weight, based on the sum of the amounts of A and B, of a vinyl polymer, a cellulose derivative or a low molecular weight hydroxyl-containing compound, eg. diethylene glycol, butane-1,4-diol or propane-1,2-diol.

Suitable hydroxyl-containing polyesters for polyurethane (A) are saturated polyesters obtained from a polyol and a dicarboxylic acid and containing 0.5–8, in particular 1–6, % by weight of free hydroxyl groups. Preferred polyesters are those prepared by reacting the dicarboxylic acid or its anhydride with a molar excess of a polyol. Suitable dicarboxylic acids are adipic acid and o-phthalic acid, and suitable polyols are trimethylolpropane, butane-1,4-diol, propane-1,2-diol and diethylene glycol. Polyesters obtained from 1.5 molar parts of adipic acid, 1.5 molar parts of o-phthalic acid and 4 molar parts of trimethylolpropane, containing 5% of hydroxyl groups and having a low degree of branching and a viscosity of about 18,000 mPa.s, and linear polyesters obtained from 10 molar parts of adipic acid and 11 molar parts of diethylene glycol, containing 1% of hydroxyl groups and having a viscosity of 15,000 mPa.s, and combinations of these two types of polyester, are particularly preferred.

Suitable thermoplastic, high molecular weight phenoxy resins (B) are those which have a molecular weight of from 10,000 to 50,000, preferably from 20,000 to 30,000, and contain small amounts of epoxide groups and preferably from 4 to 8, in particular from 5 to 7, percent by weight, based on the resin, of hydroxyl groups.

Particularly suitable epoxy resins are those prepared from bisphenol A and epichlorohydrin and having an OH content of 6.1% by weight and a molecular weight of 30,000. Typical examples of the preferred phenoxy resins are the straight-chain polymeric diglycidyl ethers of bisphenol A, containing the repeating structural unit of the formula

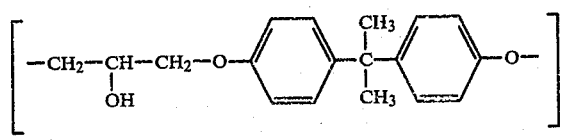

To harden and crosslink the above polyester components of polyurethane (A), and in part also component (B), the di- and polyisocyanates conventionally used in polyurethane chemistry, preferably those with two or more aromatically bonded isocyanate groups, are employed. Examples of these are hexamethylene 1,6-diisocyanate, dicyclohexylmethane 4,4'-diisocyanate, isophorone di-isocyanate, toluylene 2,4- and 2,6-diisocyanate, m-phenylene diisocyanate, xylylene diisocyanate, diphenylmethane 4,4'-diisocyanate, naphthylene 1,5-diisocyanate, 3,3'-dimethylphenyl 4,4'-diisocyanate, triphenylmethane 4,4',4"-triisocyanate and cyclohexylene 1,4-diisocyanate, and in particular reaction products of 3 moles of toluylene diisocyanate with 1 mole of a triol, or of 3 moles of toluylene diisocyanate with 2 moles of hexamethylene diisocyanate. For crosslinking the hydroxyl-containing components of the binder system, the isocyanates are employed in amounts such that the ratio of the number of equivalents of isocyanate groups to that of the free hydroxyl groups of the polyester component is from 1:0.6 to 1:1.3, in particular from 1:0.9 to 1:1.1.

A binder mixture consisting of from 65 to 85% by weight of the polyurethane (A) and from 35 to 15% by weight of the phenoxy resin (B) has proved particularly advantageous for the novel process.

To carry out the novel process, the magnetically anisotropic material, in particular ferromagnetic chromium oxide, ferromagnetic metal particles consisting essentially of iron, or non-doped or doped iron oxides, together with the conventional additives, such as dispersing aids, eg. lecithin, small amounts of monocarboxylic acids or mixtures of these, zinc oleate, zinc stearate or zinc isostearate, fillers, such as conductive carbon, graphite, quartz, powder and/or non-magnetizable powders based on silicate, lubricants, such as isostearic acid or butyl stearate, flow improvers, such as small amounts of silicone oil, organic solvents, such as tetrahydrofuran, dimethylformamide, dioxane or ketones, esters or aromatic hydrocarbons, eg. methyl ethyl ketone, ethylglycol acetate, benzene or toluene, or, if appropriate, mixtures of these solvents, the polyester component of polyurethane (A), and the binder component (B), dissolved in an organic solvent, are processed in a dispersing apparatus, eg. a tubular ball mill or a stirred ball mill, into a dispersion. A solution of the isocyanate component of polyurethane (A) is stirred into the resulting magnetic dispersion, and this is then applied, by means of a conventional coating apparatus, eg. a knife coater, to the non-magnetic base made for example from any conventional base material, in particular a film obtained from a straight-chain polyester, eg. polyethylene terephthalate, generally having a thickness of from 4 to 200 μm, in particular from 6 to 36 μm. Before the binder components are crosslinked and the still fluid coating mix is dried on the base (an operation which is advantageously carried out at from 50° to 90° C. for from 2 to 5 minutes), the magnetically anisotropic particles are oriented in the envisaged recording direction by the action of a magnetic field. The magnetic layers can subsequently be calendered on conventional equipment by passing the coated base material between polished rollers with the application of pressure, at from room temperature to 100° C., preferably from 40° to 80° C. The thickness of the magnetic layer is in general from 1 to 15 μm.

The magnetic recording media produced by the novel process possess improved magnetic and mechanical properties compared with those of media produced by the prior art. A property to be singled out is the high orientation ratio which can be achieved as a result of the good orientability of the special magnetic materials; the orientation ratio is the ratio of the residual magnetization in the direction of particle orientation so the residual magnetization at right angles to this direction. As a result of this, and of an increase, effected at the same time, in the residual magnetization in the recording direction, the recording characteristics of audio and video tapes in particular but also of tapes for recording data signals are greatly improved. In the case of the mechanical properties, the advantageous effect of the novel process manifests itself in the high abrasion resistance of the magnetic layer, coupled with a low coefficient of friction, and the smooth surface, which results in advantageous recording characteristics. The surface of the magnetic recording medium, obtained without calendering, is so smooth that the recording medium may be used directly for recording. Where high demands are placed on the recording quality, calendering is required, but lower pressures and temperatures than those used for calendering prior art magnetic coatings can be employed. Further advantages of the novel process are that less energy is required to produce the dispersion and less solvent has to be used in the dispersion.

In the Examples and Comparative Experiments which follow, parts and percentages are by weight, unless stated otherwise.

EXAMPLE 1

900 g of a chromium dioxide having a coercive force of 48 kA/m, 820 g of a solvent mixture comprising equal parts of dioxane and tetrahydrofuran, 18 g of zinc oleate, 47 g of a commercial polyester, obtained from 1.5 molar parts of adipic acid, 1.5 molar parts of phthalic acid and 4 molar parts of trimethylolpropane, having a low degree of branching and containing 5% of hydroxyl groups, and 101 g of a 20% strength solution of a phenoxy resin, obtained from bisphenol A and epichlorohydrin, having a mean molecular weight of 30,000 and containing 6% of hydroxyl groups, in the above solvent mixture were introduced into a steel ball mill having a capacity of 6 liters and containing 8 kg of steel balls 4-6 mm in diameter, and the mixture was dispersed for 46 hours. Thereafter, 47 g of a commercial straight-chain polyester, obtained from 10 molar parts of adipic acid and 11 molar parts of diethylene glycol and containing 1% of hydroxyl groups, 101 g of the above 20% strength solution of the phenoxy resin, a further 400 g of the above solvent mixture, 18 g of n-butyl stearate and 4 g of stearic acid were added, and the entire mixture was dispersed for a further 4 hours. The resulting dispersion was forced under pressure through a filter having a pore width of 5 μm and, while stirring vigorously, 56.4 g of a 75% strength solution of a triisocyanate, obtained from 3 moles of toluylene diisocyanate and 1 mole of trimethylolpropane, in ethyl acetate were added, immediately after which the dispersion was applied to a 19 μm thick polyethylene terephthalate film by means of a conventional knife coater. The coated film was passed through a magnetic field to orient the chromium dioxide particles, and the coating was then dried at from 50° to 90° C. After drying, the coated film was calendered by passing it between heated rollers (80° C., nip pressure 200 kp/cm), and was then slit into 3.81 mm wide audio tapes and into ½ inch wide video tapes. The crosslinking reaction to form polyurethane took place during and for a short time after the production of the tape.

The magnetic properties were measured in a magnetic field of 160 kA/m. The surface roughness was determined as the average peak-to-valley height $R_Z$ according to DIN 4768, Sheet 1. As regards the recording characteristics, the electroacoustic properties were measured according to DIN 45,401, 45,403 and 45,512 (Sheet 12) against reference tape C 401 R, and the video characteristics against the VHS reference tape from Victor Company of Japan. The results of the measurements are given in Table 1.

COMPARATIVE EXPERIMENT 1

900 g of the same chromium dioxide as was used in Example 1, 630 g of a solvent mixture comprising equal parts of dioxane and tetrahydrofuran, 18 g of zinc oleate, 647 g of a 12.5% strength solution of a polyester-polyurethane with a K value of 60, prepared from a polyester obtained from butanediol and adipic acid (0.42 mole), butanediol (0.55 mole), trimethylolpropane (0.03 mole) and diphenylmethane diisocyanate (1.05 moles), in the above solvent mixture, and 101 g of a 20% strength solution of a phenoxy resin, obtained from bisphenol A and epichlorohydrin, having a mean molecular weight of 30,000 and containing 6% of hydroxyl groups, likewise in the above solvent mixture were introduced into a steel ball mill having a capacity of 6 liters and containing 8 kg of steel balls 4-6 mm in diameter, and the mixture was dispersed for 92 hours. Thereafter, 647 g of the same polyester-polyurethane solution, 101 g of the same phenoxy resin solution, 18 g of n-butyl stearate, 4 g of stearic acid and 235 g of the above solvent mixture were added, and the mixture was dispersed for a further 24 hours. The resulting dispersion was passed under pressure through a filter having a pore width of 5 μm and then applied to a 19 μm thick polyethylene terephthalate film as described in Example 1, the coated film was processed into tapes which were tested. The results of the measurements are listed in Table 1.

TABLE 1

|  | Example 1 | Comparative Experiment 1 |
|---|---|---|
| After coating but without calendering: |  |  |
| Average peak-to-valley height $R_Z$ [μm] | 0.25 | 0.52 |
| Gloss | 95 | 47 |
| Residual magnetization [mT] | 130 | 98 |
| Relative remanence | 0.86 | 0.79 |
| Orientation ratio | 3.0 | 0.7 |
| After calendering: |  |  |
| Average peak-to-valley height $R_Z$ [μm] | 0.15 | 0.21 |
| Gloss | 180 | 140 |
| Residual magnetization [mT] | 154 | 110 |
| Relative remanence | 0.87 | 0.78 |
| Orientation ratio | 3.0 | 1.7 |
| Electroacoustic properties measured against: |  |  |
| Reference tape C 401 R: |  |  |
| Sensitivity at long wavelengths $S_L$ 315 Hz [Δ db] | −0.2 | −2.0 |
| Sensitivity at short wavelengths $S_H$ 10 kHz [Δ db] | +4.8 | +2.9 |
| Maximum output level at long wavelengths 315 Hz [Δ db] | −1.6 | −5.6 |
| Maximum output level at short wavelengths 10 kHz [Δ db] | +5.4 | +4.2 |
| Thickness of magnetic layer [μm] | 3.6 | 3.2 |
| Video characteristics (Reference tape VHS): |  |  |
| High frequency level at 4.8 MHz [Δ db] | +1.9 | −0.5 |
| Playback level of chrominance signal recorded at 630 kHz | +3.1 | +0.6 |
| Luminance signal-to-noise ratio [Δ db] (at cutoff frequency of 5MHz) | +0.8 | −0.8 |
| Luminance signal-to-noise ratio [Δ db](weighted) | +1.2 | −1.4 |
| Chrominance signal-to-noise ratio [Δ db] | +0.6 | −2.5 |

EXAMPLE 2

1100 g of a chromium dioxide with a coercive force of 38 kA/m, 902 g of a solvent mixture of equal parts of dioxane and tetrahydrofuran, 27.5 g of zinc oleate, 48.3 g of a commercial polyester obtained from 1.5 molar parts of adipic acid, 1.5 molar parts of phthalic acid and 4 molar parts of trimethylolpropane, having a low degree of branching and containing 5% of hydroxyl groups, and 110 g of a 20% strength solution of a phenoxy resin, obtained from bisphenol A and epichlorohydrin, having a mean molecular weight of 30,000 and containing 6% of hydroxyl groups, in the above solvent mixture were introduced into the same steel ball mill as that used in Example 1, and the mixture was dispersed for 70 hours. Thereafter, 48.3 g of a commercial straight-chain polyester obtained from 10 molar parts of adipic acid and 11 molar parts of diethylene glycol and containing 1% of hydroxyl groups, 190 g of the above 20% strength solution of the phenoxy resin, a further 450 g of the above solvent mixture and 2.25 g of silicone oil were added, and the entire mixture was dispersed for a further 16 hours. The resulting dispersion was filtered as described in Example 1 and 57.97 g of a 75% strength solution of a triisocyanate, obtained from 3 moles of toluylene diisocyanate and 1 mole of trimethylolpropane in ethyl acetate were added while stirring vigorously, immediately after which the dispersion was applied to a 12 μm thick polyethylene terephthalate film by means of a conventional knife coater. The coated film was passed through a magnetic field to orient the chromium dioxide particles and then dried at from 50° to 90° C. After drying, a part of the film coated with the magnetic layer was calendered by passing it between rollers at 85° C. using a nip pressure of 200 kp, another part was calendered by passing it between unheated rollers using a nip pressure of 200 kp, and a third part was not calendered. All three parts were slit into 3.81 mm wide audio tapes. The crosslinking reaction to form polyurethane took place during and for a short time after the production of the tapes.

The magnetic properties, the surface roughness, the gloss and the electroacoustic values were measured as described in Example 1. The results of the measurements are summarized in Table 2.

COMPARATIVE EXPERIMENT 2

900 g of chromium dioxide with a coercive force of 38 kA/m, 630 g of a solvent mixture of equal parts of dioxane and tetrahydrofuran, 22.5 g of zinc oleate, 513 g of a 13% strength solution of a polyester-polyurethane, having a K value of 60 and prepared from a polyester obtained from butanediol and adipic acid (0.42 mole), butanediol (0.55 mole), trimethylolpropane (0.03 mole) and diphenylmethane diisocyanate (1.05 mole), in the above solvent mixture, and 333 g of a 10% strength solution of polyvinyl alcohol acetalized with formaldehyde, likewise in the above solvent mixture, were introduced into a ball mill as described above, and the mixture was dispersed for 120 hours. Thereafter, a further 326 g of the polyester-polyurethane solution, 212 g of the solution of polyvinyl alcohol acetalized with formaldehyde, 2.25 g of silicone oil and a further 385 g of the above solvent mixture were added and the entire mixture was dispersed for a further 24 hours. The resulting dispersion was applied as described in Example 2, the coated film obtained was processed into tapes which were tested. The results of the measurements are given in Table 2.

TABLE 2

|  | Example 2 | | | Comparative Experiment 2 | | |
| --- | --- | --- | --- | --- | --- | --- |
|  | not calendered | calendered at RT | calendered at 85° C. | not calendered | calendered at RT | calendered at 85° C. |
| Average peak-to-valley height $R_Z$ [μm] | 0.37 | 0.19 | 0.16 | 1.02 | 0.47 | 0.31 |
| Gloss | 61 | 177 | 185 | 13 | 95 | 149 |
| Residual magnetization [mT] | 133 | 174 | 197 | 122 | 124 | 146 |
| Relative remanence | 0.85 | 0.86 | 0.86 | 0.79 | 0.79 | 0.79 |
| Orientation ratio | 3.0 | 3.0 | 3.0 | 1.9 | 1.9 | 1.9 |
| Electroacoustic data (reference tape C 401 R) | | | | | | |
| Sensitivity at long warelengths $S_L$ 315 Hz [ΔdB] | −1.1 | +1.3 | +1.7 | −2.2 | −0.8 | 0 |
| Sensitivity at short wavelengths $S_H$ 10 kHz [ΔdB] | −2.3 | +1.5 | −2.1 | −9.5 | −4.2 | −1.5 |
| Maximum output level at long wavelengths $O_L$ 315 Hz [ΔdB] | −0.7 | +3.0 | +3.7 | −3.0 | −1.2 | 0 |
| Maximum output level at short wavelengths $O_H$ 10 kHz [ΔdB] | −2.5 | +1.0 | +2.5 | −8.1 | −6.7 | −1.2 |
| Thickness of magnetic layer [μm] | 7.1 | 4.9 | 5.0 | 6.1 | 5.7 | 5.1 |

EXAMPLE 3

1,000 g of Co-doped iron oxide having a coercive force of 30 kA/m, 920 g of a solvent mixture of equal parts of dioxane and tetrahydrofuran, 35 g of a dispersant based on a mixture of a monophosphate with a salt of a sulfosuccinic acid, 34.1 g of a commercial polyester obtained from 1.5 molar parts of adipic acid, 1.5 molar parts of phthalic acid and 4 molar parts of trimethylolpropane, having a low degree of branching and containing 5% of hydroxyl groups, 100 g of a 20% strength solution of a phenoxy resin, obtained from bisphenol A and epichlorohydrin, having a mean molecular weight of 30,000 and containing 6% of hydroxyl groups, in the above solvent mixture were introduced into a ball mill in the manner described above, and the mixture was dispersed for 30 hours. Thereafter, 49.1 g of a commercial straight-chain polyester obtained from 10 molar parts of adipic acid and 11 molar parts of diethylene glycol and containing 1% of hydroxyl groups, 150 g of the above 20% strength solution of phenoxy resin, 1.0 g of silicone oil, 2.0 g of hydroquinone, 2.0 g of n-butyl stearate, 10.0 g of isostearic acid and 100 g of the above solvent mixture were added and the entire mixture was dispersed for a further 3 hours.

The resulting dispersion was passed under pressure through a filter having a pore width of 5 μm, and 44.7 g of a 75% strength solution of a triisocyanate, obtained from 3 moles of toluylene diisocyanate and 1 mole of trimethylolpropane, in ethyl acetate were added while stirring vigorously, immediately after which the dispersion was applied to a 12 μm thick polyethylene terephthalate film by means of a conventional knife coater. The coated film was passed through a magnetic field to orient the magnetic particles and was then dried at from 50° to 90° C. After drying, the coated film was calendered by passing it between rollers heated to 75° C., using a nip pressure of 200 kp/cm, after which it was slit into 3.81 mm wide audio tapes. The crosslinking reaction to form polyurethane took place during and for a short time after the production of the tapes.

The magnetic properties were measured in a magnetic field of 100 kA/m. The surface roughness and the gloss were measured as described in Example 1. The electroacoustic properties were determined in accordance with DIN 45,401, DIN 45,403 and DIN 45, 512, Sheet 12, against the reference tape IEC 1.

After coating but without calendering:

| | |
|---|---|
| Average peak-to-valley height $R_Z$ [μm] | 0.35 |
| Gloss | 56 |
| Residual magnetization [mT] | 136 |
| Relative remanence | 0.89 |
| Orientation ratio | 3.2 |

After calendering:

| | |
|---|---|
| Peak-to-valley height $R_Z$ [μm] | 0.20 |
| Gloss | 149 |
| Residual magnetization [mT] | 189 |
| Relative remanence | 0.89 |
| Orientation ratio | 3.2 |

Electroacoustic properties (reference tape IEC 1):

| | |
|---|---|
| Sensitivity at long wavelengths $S_L$ 315 Hz [Δ dB] | +1.5 |
| Sensitivity at short wavelengths $S_H$ 10 kHz [Δ dB] | +3.5 |
| Maximum output level at long wavelengths $O_L$ 315 Hz [Δ dB] | +2.8 |
| Maximum output level at short wavelengths $O_H$ 10 kHz [Δ dB] | +2.4 |

-continued

| | |
|---|---|
| Thickness of magnetic layer [μm] | 5.0 |

We claim:

1. A process for the production of a magnetic recording medium by dispersing a finely divided magnetically anisotropic material in a solution of a film-forming binder mixture and, if desired, a further polymeric binder, in an organic solvent, with the addition of conventional assistants, applying a layer of the fluid dispersion to a non-magnetic base, orienting the magnetic particles by means of a magnetic field, crosslinking the binder components and drying the resulting layer, wherein the film-forming binder mixture comprises
    (A) from 60 to 90 percent by weight of a polyurethane binder, obtained from a straight-chain or branched polyester containing 0.5–8% of hydroxyl groups and a di- or polyisocyanate, and
    (B) from 10 to 40 percent by weight of a thermoplastic hydroxyl-containing phenoxy resin having a molecular weight of from 10,000 to 50,000,
with the proviso that the di- or polyisocyanate is added, in an amount of from 0.6 to 1.3 equivalents, based on one equivalent of hydroxyl groups of the polyester, only after the magnetically anisotropic material has been dispersed in components (A) and/or (B).

2. A process as claimed in claim 1, wherein component (B) is a polycondensate obtained from 2,2-bis-(4-hydroxyphenyl)-propane and epichlorohydrin, containing from 5 to 7 percent by weight of hydroxyl groups and having a molecular weight of from 20,000 to 30,000.

3. A process as claimed in claim 1, wherein the film-forming binder mixture contains, in addition to components (A) and (B),
    (C) from 0.5 to 10 percent by weight, based on the sum of the amounts of (A) and (B), of a vinyl polymer, a cellulose derivative or a low molecular weight hydroxyl-containing compound.

* * * * *